US010934481B2

United States Patent
Fan et al.

(10) Patent No.: US 10,934,481 B2
(45) Date of Patent: Mar. 2, 2021

(54) SELF-ASSEMBLY METHOD FOR CORE/SHELL NANOPARTICLES WITH ENHANCED EMISSION

(71) Applicants: National Technology & Engineering Solutions of Sandia, LLC, Albuquerque, NM (US); University of Akron, Akron, OH (US)

(72) Inventors: Hongyou Fan, Albuquerque, NM (US); Kaifu Bian, Albuquerque, NM (US); Leanne Julia Alarid, Santa Monica, CA (US); Yu Zhu, Copley, OH (US)

(73) Assignees: National Technology & Engineering Solutions of Sandia, LLC, Albuquerque, NM (US); University of Akron, Akron, OH (US)

( * ) Notice: Subject to any disclaimer, the term of this patent is extended or adjusted under 35 U.S.C. 154(b) by 403 days.

(21) Appl. No.: 15/980,119

(22) Filed: May 15, 2018

(65) Prior Publication Data
US 2018/0334616 A1 Nov. 22, 2018

Related U.S. Application Data

(60) Provisional application No. 62/509,389, filed on May 22, 2017.

(51) Int. Cl.
| | | |
|---|---|---|
| C09K 11/06 | (2006.01) | |
| C09K 11/02 | (2006.01) | |
| B01J 13/08 | (2006.01) | |
| C09B 67/02 | (2006.01) | |

(52) U.S. Cl.
CPC ............... *C09K 11/06* (2013.01); *B01J 13/08* (2013.01); *C09B 67/0097* (2013.01); *C09K 11/025* (2013.01); *C09K 2211/1416* (2013.01); *C09K 2211/1466* (2013.01)

(58) Field of Classification Search
CPC ..................................................... C09K 11/06
See application file for complete search history.

(56) References Cited

U.S. PATENT DOCUMENTS

| | | | |
|---|---|---|---|
| 6,451,459 B1 * | 9/2002 | Tieke ..................... | C09K 11/06 252/301.35 |
| 2016/0161475 A1 * | 6/2016 | Chiu ...................... | C09K 11/06 506/9 |

OTHER PUBLICATIONS

Chen, O. et al., "Compact high-quality CdSe—CdS core-shell nanocrystals with narrow emission linewidths and suppressed blinking", Nature Materials, vol. 12 (2013), pp. 445-451; DOI: 10.1038/NMAT3539.
Hu, Z. et al., "An insight into non-emissive excited states in conjugated polymers", Nature Communications, Published Sep. 22, 2015, pp. 1-9; DOI: 10.1038/ncomms9246.
Yang, K. et al., "Patternable Conjugated Polymers with Latent Hydrogen-Bonding on the Main Chain", Macromolecules, vol. 47 (2014), pp. 8479-8486.

* cited by examiner

*Primary Examiner* — Matthew E. Hoban
(74) *Attorney, Agent, or Firm* — Kevin W. Bieg

(57) ABSTRACT

A core/shell nanoparticle with enhanced emission comprises a fluorescent conjugated polymer core that is encapsulated by an amphiphilic block copolymer shell. The core/shell nanoparticle structure confines the electronic charge to improve quantum yield and is water soluble to enable low-cost and environmentally friendly processing.

12 Claims, 16 Drawing Sheets

P-PDPP-FLR

SELF-ASSEMBLY METHOD FOR CORE/SHELL NANOPARTICLES WITH ENHANCED EMISSION

CROSS-REFERENCE TO RELATED APPLICATION

This application claims the benefit of U.S. Provisional Application No. 62/509,389, filed May 22, 2017, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to polymer nanoparticles and, in particular, to a self-assembly method for core/shell nanoparticles with enhanced emission.

BACKGROUND OF THE INVENTION

Conjugated polymers have many attractive features for optoelectronic applications, including that they are semiconducting, lightweight, flexible, low cost, low toxicity, and enable easy device fabrication. Applications of $\pi$-conjugated polymers include organic light-emitting diodes (OLED), organic field-effect transistors (OFET), and organic photovoltaics (OPV).

However, $\pi$-conjugated polymers face a number of challenges, including low quantum yields (2-5% in bulk aggregates). In particular, charge-transfer type excitons can suppress emission, especially in polar environments. Inter-chain electronic delocalization can also lower quantum yield. Therefore, to improve quantum yield it is necessary to simultaneously suppress charge-transfer type excitons and inter-chain electronic delocalization.

An existing solution is to use non-polar (low $\delta$) solvents to enhance quantum yield. See Hu et al., *Nat. Commun.* 6 (2015). However, this solution limits device fabrication capability. Another solution is to use nanoparticles of photoactive polymers. See Lin et al., *Macromolecular Rapid Comm.* 35(9), 895 (2014). However, this solution does not suppress the inter-chain electronic interaction.

SUMMARY OF THE INVENTION

The present invention is directed to a core/shell nanoparticle structure that confines the charge to improve quantum yield and is water soluble to enable low-cost and environmentally friendly processing. The core/shell nanoparticle with enhanced emission comprises a fluorescent conjugated polymer core that is encapsulated by an amphiphilic block copolymer shell. The invention is further directed to a method for self-assembly of a core/shell nanoparticle with enhanced emission, comprising providing a solution comprising a fluorescent conjugated polymer and an amphiphilic block copolymer dissolved in an organic solvent; and injecting an aqueous acid into the solution to form a core/shell nanoparticle comprising the fluorescent conjugated polymer core encapsulated by the amphiphilic block copolymer shell comprising an inner hydrophobic block and an outer hydrophilic block.

For self-assembly, the fluorescent conjugated polymer must be hydrophobic and soluble together with the block copolymer in a common solvent. The fluorescent conjugated polymer can be any of the common fluorophores combining aromatic groups or planar or cyclic molecules having $\pi$ bonds. The amphiphilic block copolymer can comprise polystyrene-b-polyvinylpyridine copolymer, such as PS-P4VP, PS-P2VP, PS-PVP-PS, or PVP-PS-PVP. Other amphiphilic block copolymers can be used, such as other poly(vinylpyridine)-based block copolymers, poly((meth)acrylic acid)-based block copolymer, poly(ethylene oxide)-based block copolymer, polysiloxane-based block copolymer, poly(styrene)-based block copolymer, or poly vinyl naphthalene-based block copolymer. Common organic solvents that can be used include dimethylformamide, tetrahydrofuran, and dioxane. The aqueous acid can comprise an inorganic acid, such as HCl, $HNO_3$, $H_2SO_4$, chloroplatinic acid, chloroauric acid, or chloroiridic acid, or an organic acid containing a carboxylic acid or sulfonic acid group, such as formic acid, acetic acid, benzene sulfonic acid, acrylic acid, glucuronic acid, lactic acid, citric acid, or amino acid.

As an example of the invention, core/shell nanoparticles were assembled comprising a poly-1,4-diketo-3,6-bis(4-bromophenyl)pyrrolo[3,4-c]pyrrole-fluorene (P1) core and a polystyrene-b-polyvinylpyridine (PS-PVP) shell. Large block copolymers formed spherical nanoparticles of about 45 nm size. The water-soluble nanoparticles show strong photoluminescence emission. A red shift of both the absorption and photoluminescence spectra indicates increasing delocalization of electronic states as the P1 fraction increases. Therefore, a lower P1 fraction results in a higher photoluminescence quantum yield. The quantum yield improved from 1.3% for P1 in solution to 12.5% for a core-shell nanoparticle.

BRIEF DESCRIPTION OF THE DRAWINGS

The detailed description will refer to the following drawings, wherein like elements are referred to by like numbers.

DETAILED DESCRIPTION OF THE INVENTION

Figure 1A:
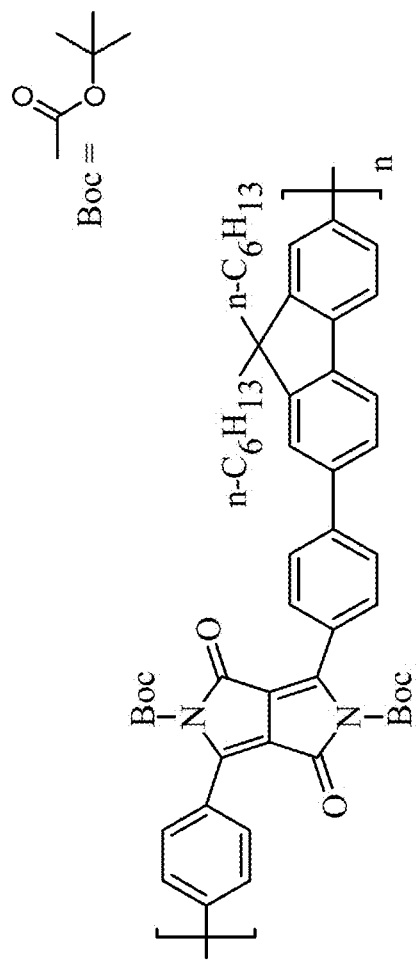
FIG. 1A is an illustration of poly-1,4-diketo-3,6-bis(4-bromophenyl)pyrrolo[3,4-c]pyrrole-fluorene (P-PDPP-FLR).
Figure 1B:
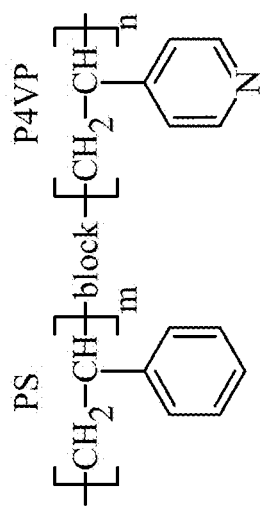
FIG. 1B is an illustration of polystyrene-b-polyvinylpyridine) (PS-PVP) block copolymer.
Figure 2:
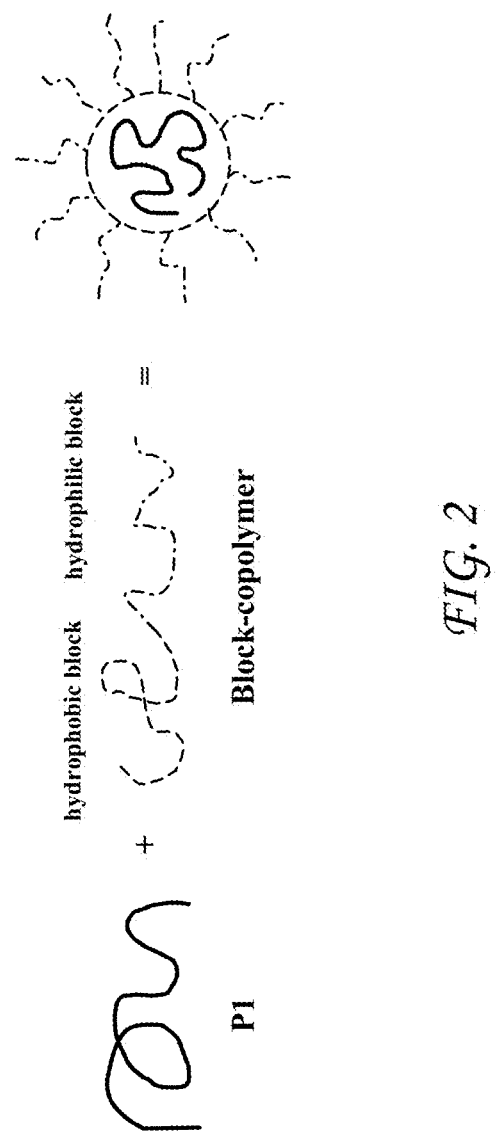
FIG. 2 is a schematic illustration of the self-assembly of a core-shell polymer nanoparticle.

The present invention is directed to core-shell nanoparticle with enhanced emission comprising a fluorescent conjugated polymer core that is encapsulated by an amphiphilic block copolymer shell. As an example of the invention, below is described a self-assembly method for a core/shell polymer nanoparticle comprising poly-1,4-diketo-3,6-bis(4-bromophenyl)pyrrolo[3,4-c]pyrrole-fluorene (P-PDPP-FLR) as the core and a poly(polystyrene-b-polyvinylpyridine) (PS-PVP) block copolymer as the shell. P-PDPP-FLR polymer (P1) is shown in FIG. 1A. See K. Yang et al., *Macromolecules* 47, 8479 (2014). As used herein, P1-Hi and P1-Lo represent high and low molecular weight versions of the P1 polymer, respectively. Both polymers are red in color. A PS-P4VP block copolymer is shown in FIG. 1B, where m and n denote the degrees of polymerization of the PS and P4VP blocks, respectively. The P1 polymers were encapsulated in PS-PVP to form nanoparticles (NPs) by a titration method. As shown in FIG. 2, the method comprises self-assembly of the amphiphilic block copolymer in aqueous solution to provide encapsulation of P1 by the hydrophobic PS block. The outer hydrophilic PVP block provides water solubility. The product can be purified by centrifugation and washing.

Figure 3B:
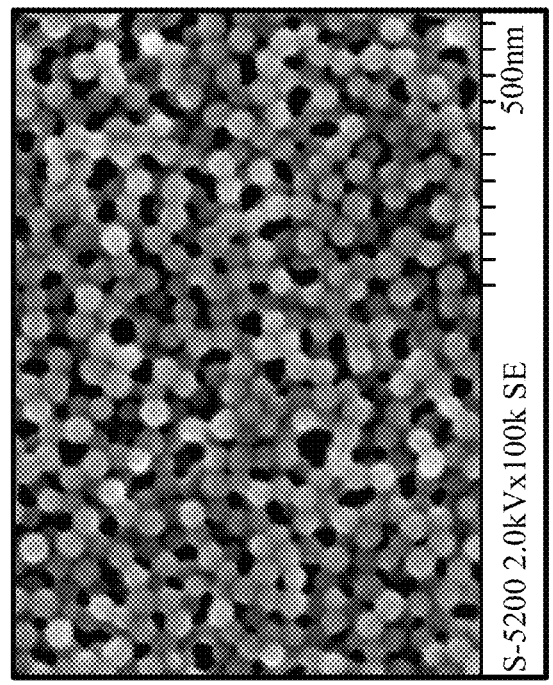
FIG. 3B is an SEM image of the nanoparticles formed from P1-Lo/PS-PVP.
Figure 3A:
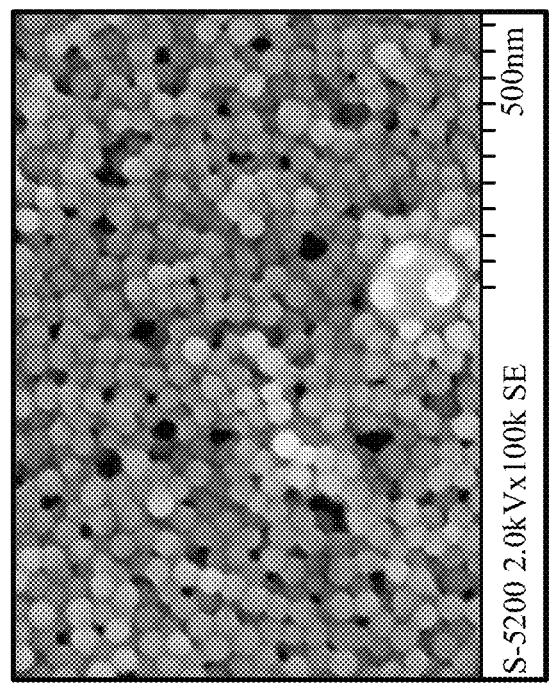
FIG. 3A is an SEM image of the nanoparticles formed from P1-Hi/PS-PVP.

As an example, 2 mL, 50 mg/mL solutions of P3200 ($PS_{480K} PVP_{145K}$) in dimethylformamide (DMF) were prepared. The solutions were stirred at 70° C. to fully dissolve the P3200 polymer until clear and transparent. 9 mg of P1-Hi and 9 mg of P1-Lo polymers were each dissolved in 0.5 mL DMF. This solution is equivalent to ~4:1 ratio of PS blocks to P1 polymer by molecular weight. The P1-Hi dissolves to red-orange. P1-Lo dissolves to yellow-orange. When all were fully soluble, 1 mL of P3200/DMF was combined with each P1-Hi and P1-Lo solution to make two 1.5 mL polymer solutions. 5 mL of HCl water solution was slowly injected into each of the two solutions. The solutions were stirred at room temperature for the duration of the injection. The final solutions were slightly viscous and gel like. The P1-Hi solution was bright red orange and the P1-Lo solution was bright yellow. The raw product was centrifuged to separate and purify the gel from liquid and phase-separate the polymers. A reasonable amount of gel was obtained. SEM images showed the formation of nanoparticles. FIG. 3A is a scanning electron micrograph (SEM) image of the nanoparticles formed from P1-Hi/PS-PVP. FIG. 3B is an SEM image of the nanoparticles formed from P1-Lo/PS-PVP.

Figure 4A:
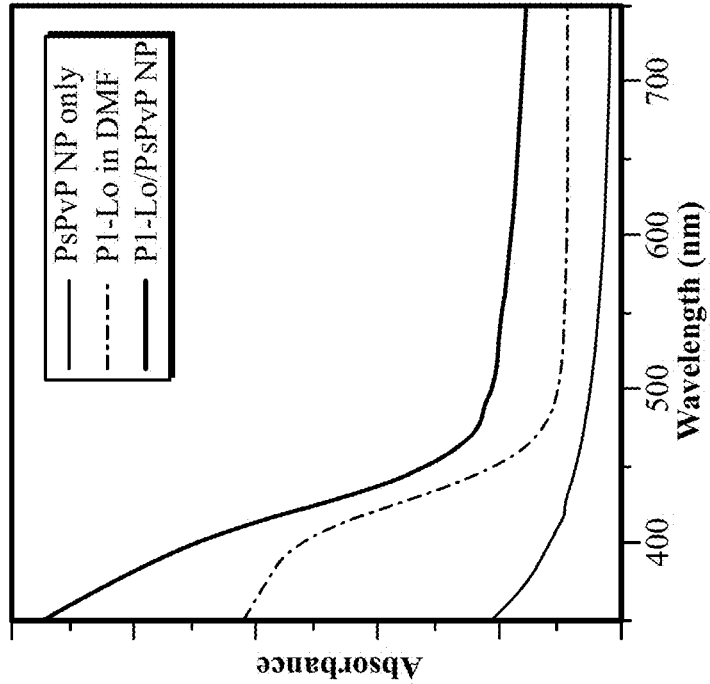
FIG. 4A shows optical absorption spectra of PS-PVP nanoparticles, P1-Hi in DMF solvent, and P1-Hi/PS-PVP nanoparticles.
Figure 4B:
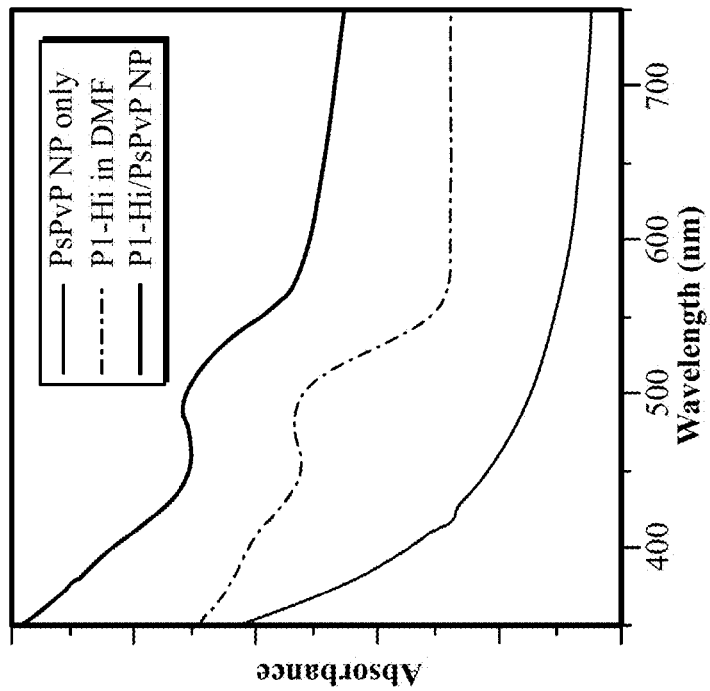
FIG. 4B shows optical absorption spectra of PS-PVP nanoparticles, P1-Lo in DMF solvent, and P1-Lo/PS-PVP nanoparticles.

Optical absorption spectra indicated successful encapsulation of P1 polymers in the PS cores of PS-PVP NPs, as shown in FIGS. 4A and 4B.

Figure 5B:
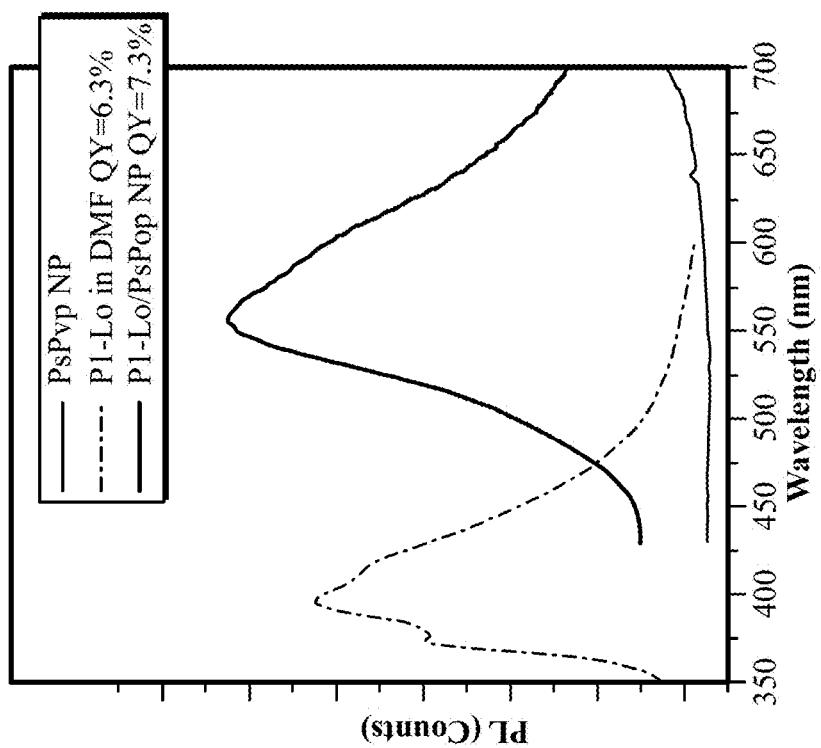
FIG. 5B shows photoluminescence spectra of PS-PVP nanoparticles, P1-Lo in DMF solvent, and P1-Lo/PS-PVP nanoparticles.
Figure 5A:
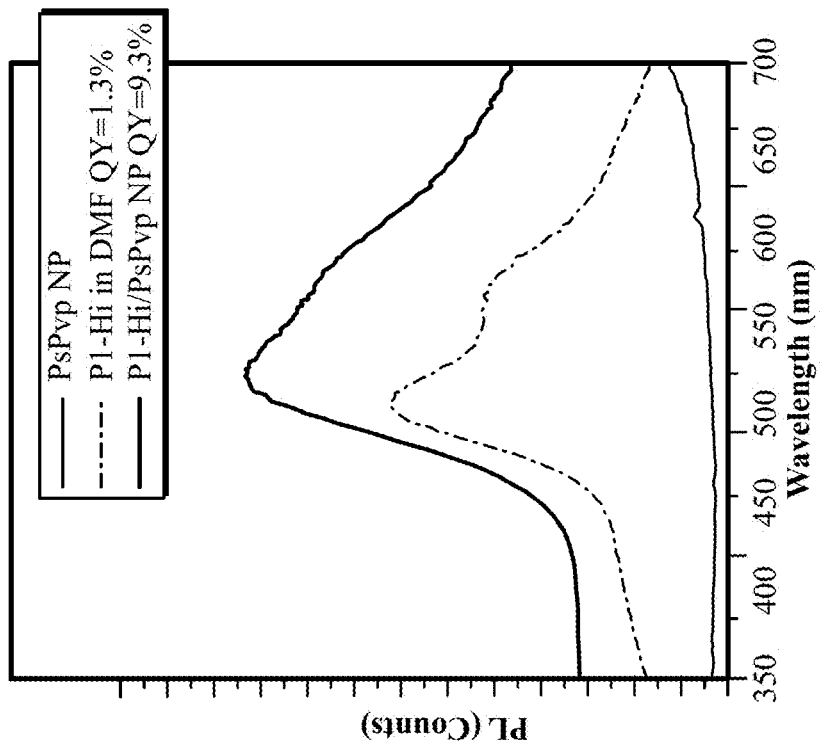
FIG. 5A shows photoluminescence spectra of PS-PVP nanoparticles, P1-Hi in DMF solvent, and P1-Hi/PS-PVP nanoparticles.

Fluorescence in both products also suggest successful encapsulation. Photoluminescence (PL) measurements showed that upon encapsulation, for the P1-Hi polymer, the PL peak red-shifted and quantum yield increased significantly from 1.3% to 9.3%, as shown in FIG. 5A. For the P1-Lo polymer, the PL peak strongly red-shifted and quantum yield increased slightly from 6.3% to 7.3% upon encapsulation, as shown in FIG. 5B.

Effect of PS:P1 Ratio

A series of encapsulation experiments were performed to study the effect of the initial ratio between P1-Hi polymer and PS segments in the PS-PVP copolymer. Weight ratios of PS:P1=1:1, 2:1, 4:1, 12:1 and 30:1 were studied.

Figure 6C:
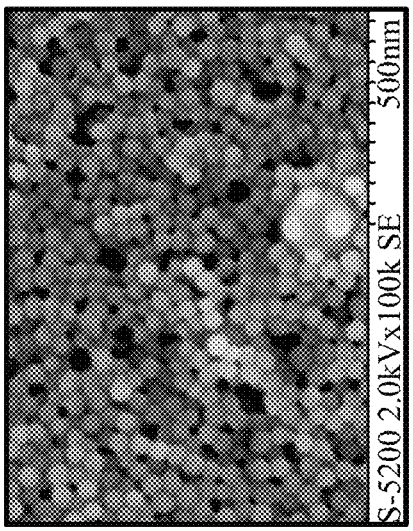
FIG. 6C is an SEM of the PS:P1=4:1 sample, with nanoparticle size of 45.8±4.3 nm.
Figure 6F:
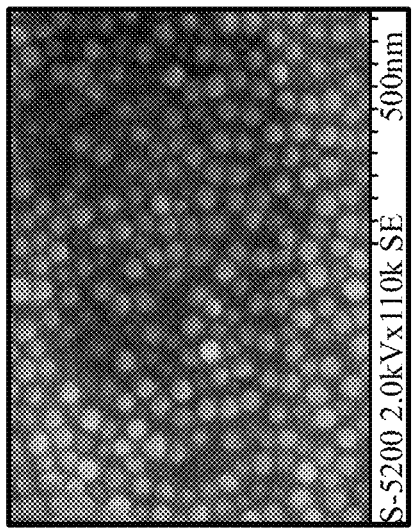
FIG. 6F is an SEM of the PS-PVP copolymer only.
Figure 6B:
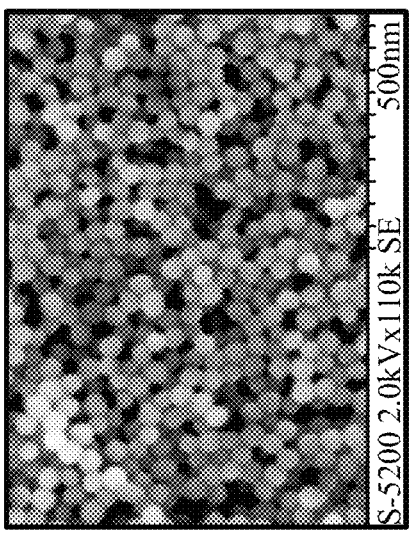
FIG. 6B is an SEM of the PS:P1=12:1 sample, with nanoparticle size of 45.8±4.3 nm.
Figure 6E:
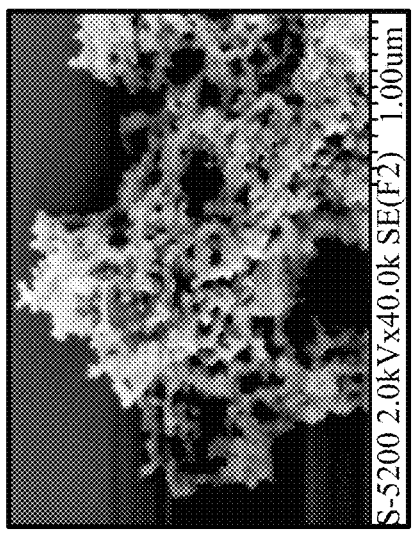
FIG. 6E is an SEM of the PS:P1=1:1 sample.
Figure 6A:
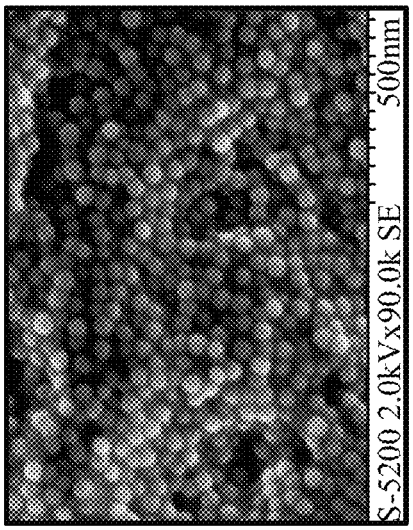
FIG. 6A is an SEM of the PS:P1=30:1 sample, with nanoparticle size of 44.5±4.0 nm.
Figure 6D:
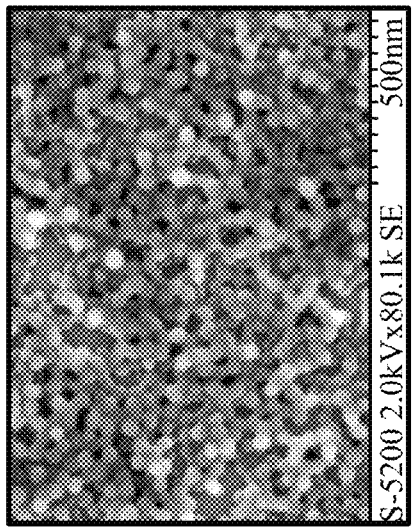
FIG. 6D is an SEM of the PS:P1=2:1 sample, with nanoparticle size of 44.8±5.8 nm.

The 1:1 weight ratio sample resulted in solid sediments which could be easily separated by low-speed centrifugation. Nearly no gel was obtained. All the other samples turned to gels with little to no sediment. These gels were concentrated by ultra-centrifugation at 100 k rpm. FIG. 6A is an SEM of the PS:P1=30:1 sample, with nanoparticle size of 44.5±4.0 nm. FIG. 6B is an SEM of the PS:P1=12:1 sample, with nanoparticle size of 45.8±4.3 nm. FIG. 6C is an SEM of the PS:P1=4:1 sample, with nanoparticle size of 45.8±4.3 nm. FIG. 6D is an SEM of the PS:P1=2:1 sample, with nanoparticle size of 44.8±5.8 nm. FIG. 6E is an SEM of the PS:P1=1:1 sample. FIG. 6F is an SEM of the PS-PVP copolymer only. The SEM images show that, except for the 1:1 sample, all samples clearly show uniform spherical nanoparticles of similar size ~45 nm. The failure of the 1:1 sample to form nanoparticles can be explained by the fact that as the fraction of P1 increases in the particle core of similar size, there are effectively less PVP chains (per particle) which can be protonated to stabilized the particles in aqueous solution. At a certain point, somewhere between 1:1 to 1:2, there are not enough PVP chains to form stable nanoparticles. Instead they form large branched sediments with some spherical features.

Figure 7:
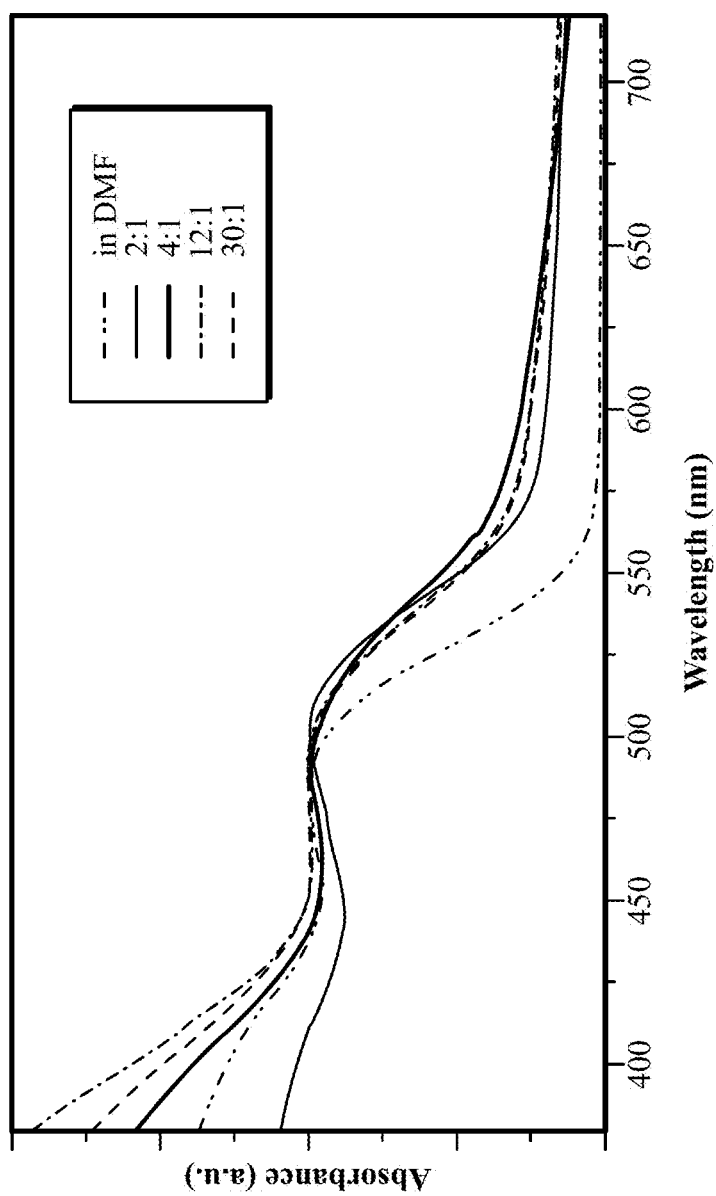
FIG. 7 shows optical absorption spectra of P1 dissolved in DMF, PS:P1=2:1 sample, PS:P1=4:1 sample, PS:P1=12:1 sample, and PS:P1=30:1 sample.

Optical absorbance spectra of the four gel samples were measured, as shown in FIG. 7. The spectra display a peak near 500 nm. Comparing with the spectrum from the P1 polymer dissolved in DMF, the nanoparticles showed a red shift which become more pronounced as the fraction of P1 increases. This can be explained by inter-molecule coupling and delocalization of the electronic states.

Figure 8:
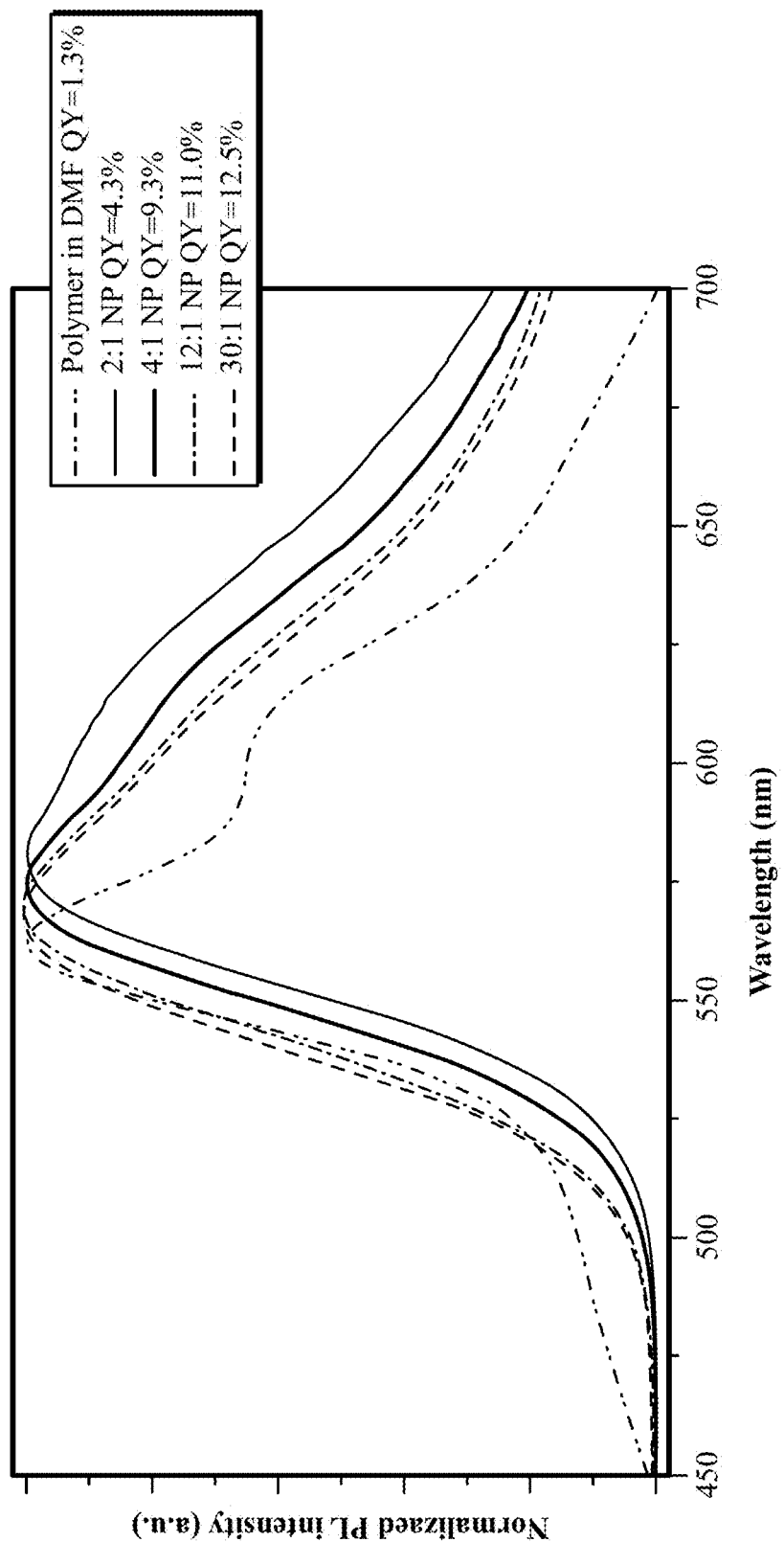
FIG. 8 shows photoluminescence spectra of P1 dissolved in DMF, PS:P1=2:1 sample, PS:P1=4:1 sample, PS:P1=12:1 sample, and PS:P1=30:1 sample.
Figure 9:
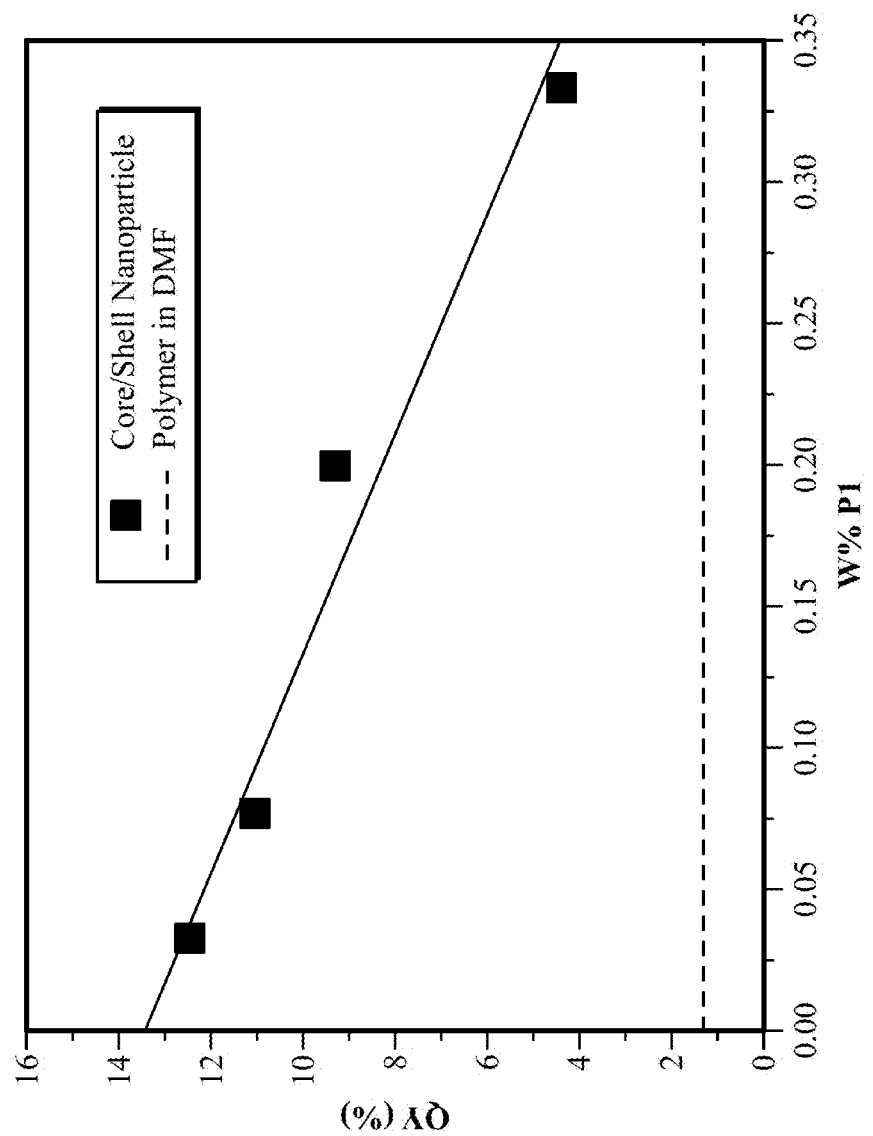
FIG. 9 is a graph of the quantum yield of the core/shell nanoparticles as a function of w % P1.

As shown in FIG. 8, the photoluminescence (PL) spectra show the same red shift trend as before, due to coupling. More interestingly, the quantum yield (QY) shows a significant enhancement when the P1 polymers are encapsulated in these nanoparticles. As shown in FIG. 9, QY increases as P1 decreases. It also shows an almost linear relationship with the weight fraction of P1. It may be that whenever the P1 chains can make direct contact with each other, the PL is quenched for some reason. As w % P1 decreases, they are better isolated by the PS-PVP shell. The limit of this effect would be that each nanoparticle contains either only one or no P1 chain. The QY of an isolated single P1 chain can be predicted to by the intercept to be ~13.4%.

Figure 10B:
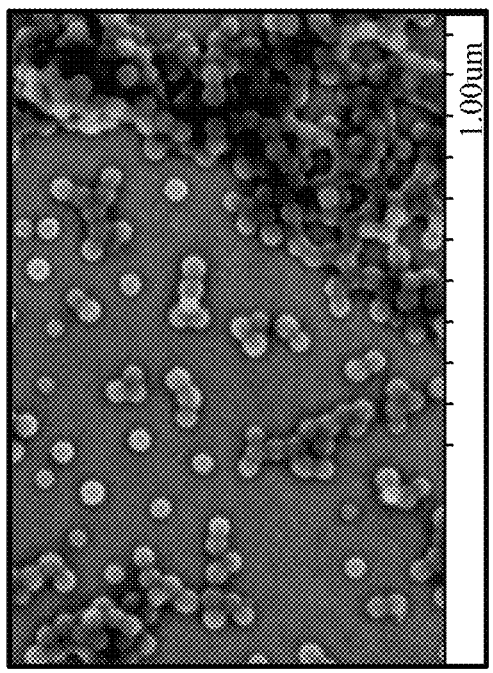
FIG. 10B is an SEM image of NPs formed with a P1:PS ratio of 1:30.
Figure 10A:
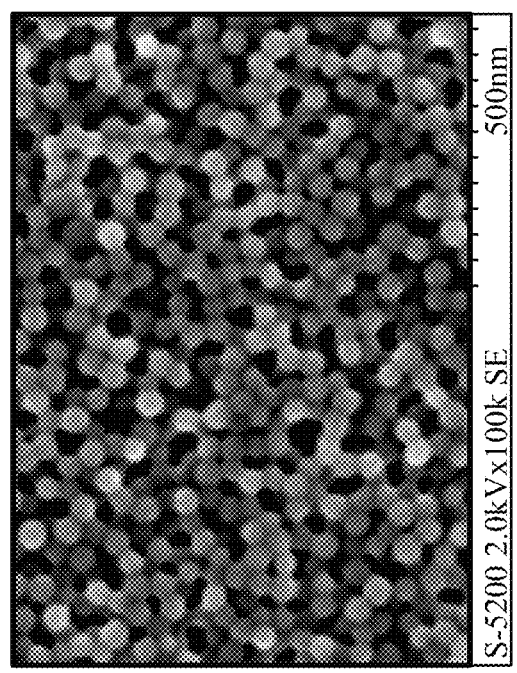
FIG. 10A is an SEM image of NPs formed with a P1:PS ratio of 1:4.
Figure 11:
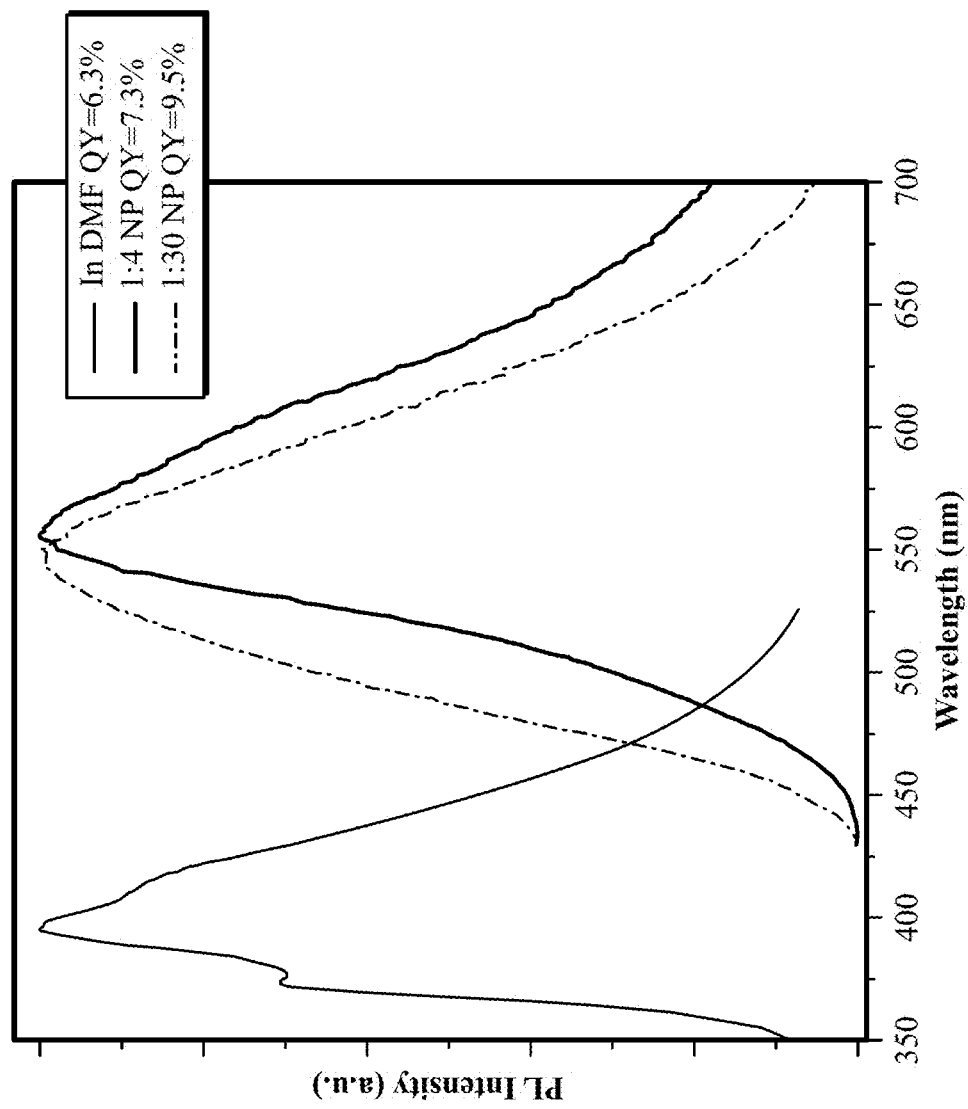
FIG. 11 shows photoluminescence spectra of P1 in DMF solvent, nanoparticles with P1:PS=1:4, and nanoparticles with P1:PS=1:30.

To test this trend, the photoluminescence quantum yield of P1-Lo before and after encapsulation with two different P1:PS ratios (1:4 and 1:30) were studied. SEM images show NP formation in both cases, as shown in FIGS. 10A and 10B. As shown in FIG. 11, optical fluorescence characterizations show the same trends as P1-Hi: a slight blue shift of PL as less P1 is added, and increased QY from 7.3% (1:4) to 9.5% (1:30).

Influence of Encapsulating Polymer

Figure 12A:
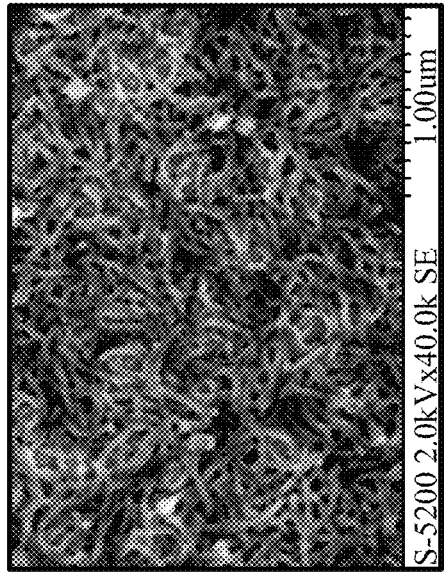
FIG. 12A is an SEM of the PS:P1=30:1 sample.
Figure 12B:
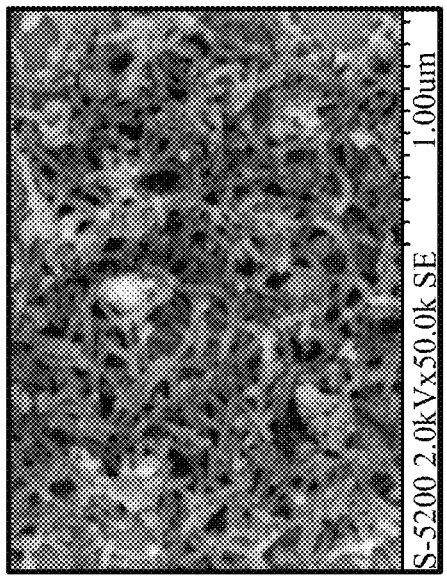
FIG. 12B is an SEM of the PS:P1=12:1 sample.
Figure 12C:
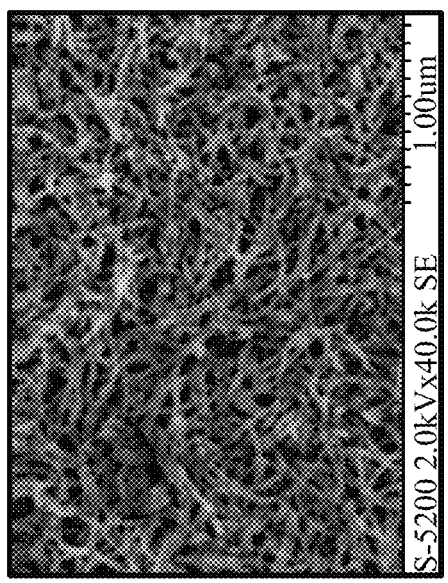
FIG. 12C is an SEM of the PS:P1=4:1 sample.
Figure 12D:
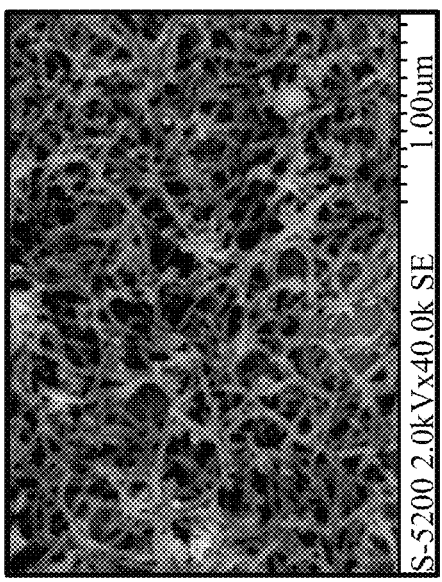
FIG. 12D is an SEM of the PS:P1=2:1 sample.

To study the influence of the encapsulating polymer, a smaller PS-PVP polymer, P99 ($PS_{32.8}K$ $PVP_{8K}$), was studied. Similar to the previous experiments, five different PS:P1-Hi ratios: 2:1, 4:1, 12:1 30:1 and 50:1 were explored. Upon injection of the aqueous acid, a red/pink cloudy suspension was obtained. SEM images of the product revealed that, instead of spherical particles, the polymer mixtures this time assembled into worm-like nanowires with diameter ~50 nm. FIG. 12A is an SEM of the PS:P1=30:1 sample, with nanowire diameter of 44.5±4.0 nm. FIG. 12B is an SEM of the PS:P1=12:1 sample, with nanowire diameter of 45.8±4.3 nm. FIG. 12C is an SEM of the PS:P1=4:1 sample, with nanowire diameter of 45.8±4.3 nm. FIG. 12D is an SEM of the PS:P1=2:1 sample, with nanowire diameter of 44.8±5.8 nm. The possible reason the morphology diverted from sphere to nanowire is that the shorter PVP cannot provide enough hydrophilic surface to make spheres. The cylindrical worms have less surface area.

Figure 13:
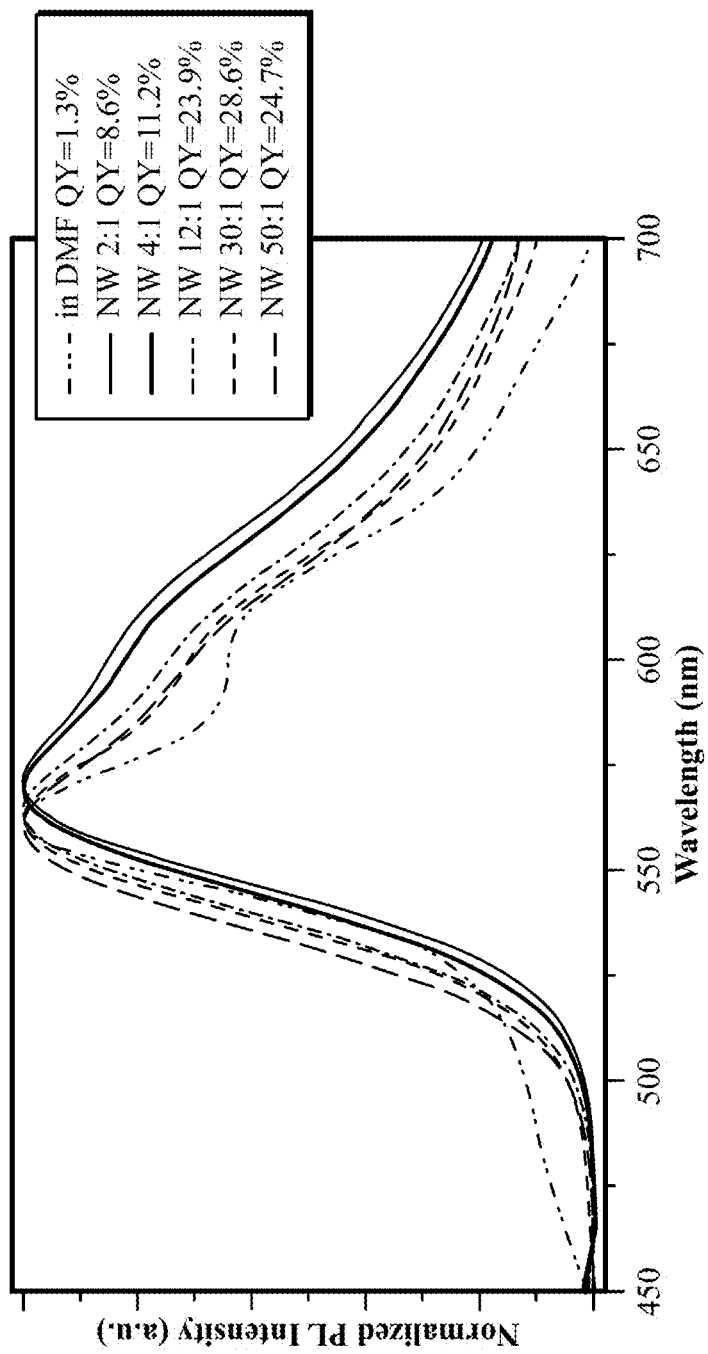
FIG. 13 shows photoluminescence spectra of P1 dissolved in DMF, PS:P1=2:1 sample, PS:P1=4:1 sample, PS:P1=12:1 sample, PS:P1=30:1 sample, and PS:P1=50:1 sample, with a small $PS_{32.8K} PVP_{8K}$ block copolymer.
Figure 14:
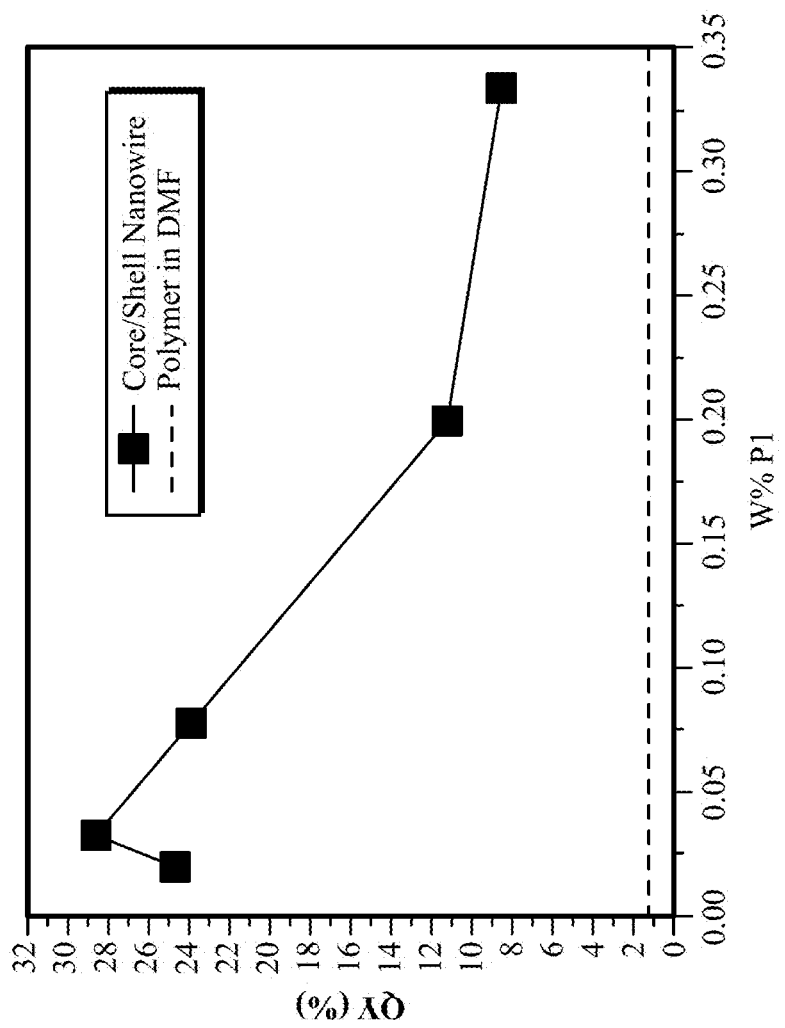
FIG. 14 is a graph of the quantum yield of the core/shell nanoparticles as a function of w % P1 core and a small $PS_{32.8K} PVP_{8K}$ block copolymer shell.

Photoluminescence measurements show a similar trend with the P99 polymer as with the P3200 polymer. As shown in FIGS. 13 and 14, as PS:P1 ratio increases, the PL peak slightly blue shifts and the QY increases. Surprisingly, the 30:1 nanoworms display a maximum QY of ~29%. This is more than 20 times higher than the free P1 molecule dissolved in DMF. It is also seen that as the PS:P1 ratio increases further to 50:1, the QY starts to decrease. This may be the result of an insufficient P1 quantity to be encapsulated in each nanowire. The PS-PVP nanowires that contain no P1 only absorb light and do not photo luminesce and therefore lower the overall QY.

Nanoparticle of P1-Hi Only

Figure 15B:
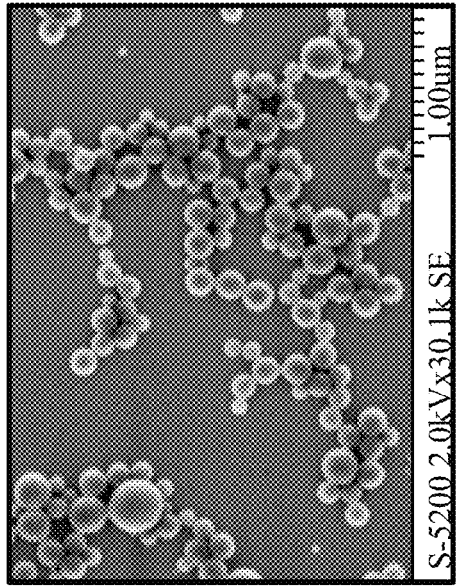
FIG. 15B is an SEM of P1-Hi only nanoparticles formed at pH=5.4.
Figure 15C:
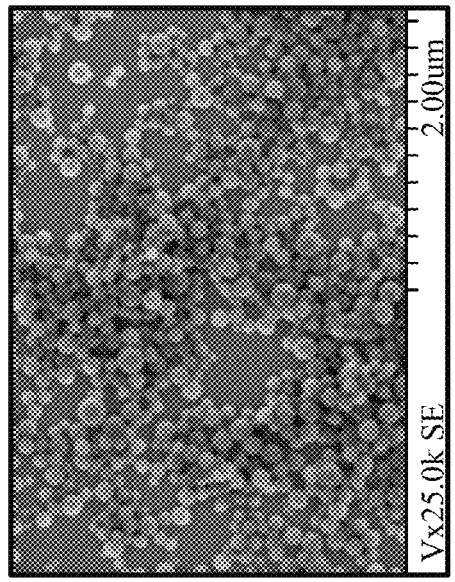
FIG. 15C is an SEM of P1-Hi only nanoparticles formed at pH=7.0.
Figure 15A:
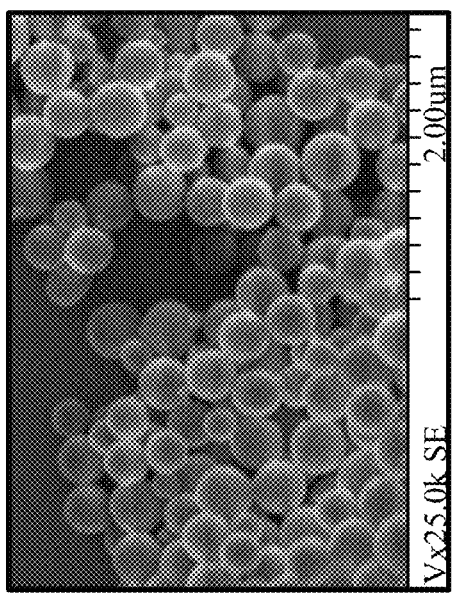
FIG. 15A is an SEM of P1-Hi only nanoparticles formed at pH=2.0.

To verify the QY improvement is actually a result of the PS-PVP encapsulation, a set of control experiments were performed by making P1-Hi only nanoparticles by the same slow-injection method without PS-PVP. Three different pH values for the injecting liquid were tried: 2.0, 5.4 and 7.0 (DI water). SEM images show that these particles are much larger than the counterparts with PS-PVP, indicating a different formation mechanism. Also, higher acidity leads to larger NPs. FIG. 15A is an SEM of P1-Hi only nanoparticles formed at 30 pH=2.0, with diameters of 356±45 nm. FIG. 15B is an SEM of P1-Hi only nanoparticles formed at pH=5.4, with diameters of 173±36 nm. FIG. 15C is an SEM of P1-Hi only nanoparticles formed at pH=7.0, with diameters of 124±26 nm.

Figure 16:
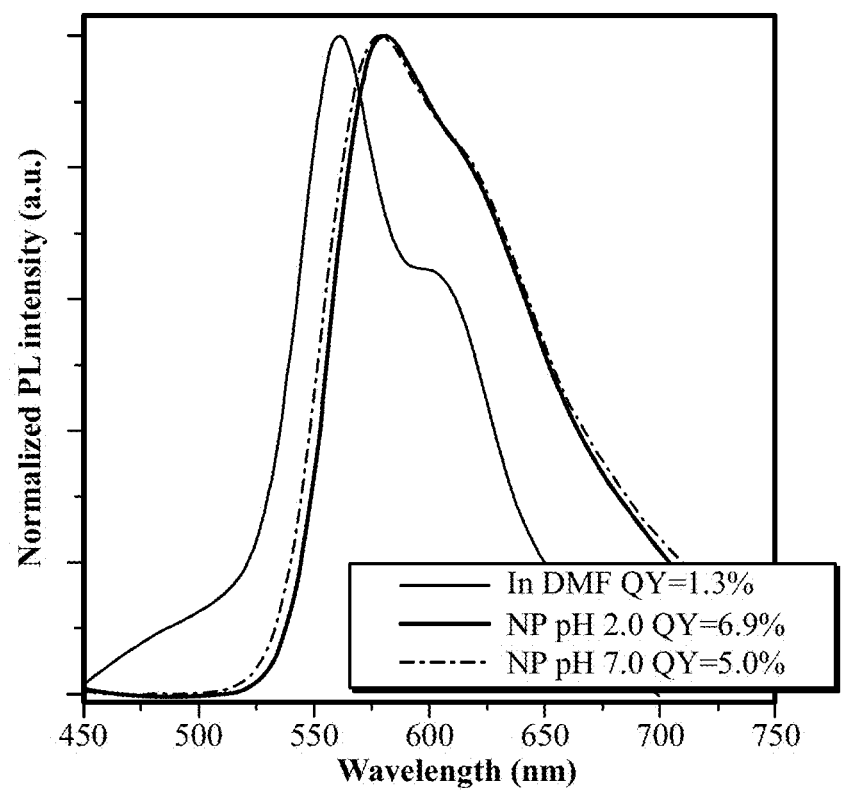
FIG. 16 shows photoluminescence spectra of P1-Hi polymer dissolved in DMF, P1-Hi only nanoparticles formed at pH=2.0, and P1-Hi only nanoparticles formed at pH=2.0.

Photoluminescence measurements shows the QY increased from the DMF solution phase, as shown in FIG. 16. However, the PS-PVP encapsulated NPs show greater QY improvements.

The present invention has been described as a self-assembly method for core/shell nanoparticles with enhanced emission. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method for self-assembly of a core/shell nanoparticle with enhanced emission, comprising:
    providing a solution comprising a fluorescent conjugated polymer and an amphiphilic block copolymer dissolved in an organic solvent; and
    injecting an aqueous acid into the solution to form a core/shell nanoparticle comprising the fluorescent conjugated polymer core encapsulated by the amphiphilic block copolymer shell comprising an inner hydrophobic block and an outer hydrophilic block.

2. The method of claim 1, wherein the fluorescent conjugated polymer comprises poly-1,4-diketo-3,6-bis(4-bromophenyl)pyrrolo[3,4-c]pyrrole-fluorene.

3. The method of claim 1, wherein the amphiphilic block copolymer comprises polystyrene-b-polyvinylpyridine.

4. The method of claim 3, wherein the amphiphilic block copolymer polystyrene-b-polyvinylpyridine comprises PS-P4VP, PS-P2VP, PS-PVP-PS, or PVP-PS-PVP.

5. The method of claim 1, wherein the amphiphilic block copolymer comprises a poly(vinylpyridine)-based block copolymer, poly((meth)acrylic acid)-based block copolymer, poly(ethylene oxide)-based block copolymer, polysiloxane-based block copolymer, poly(styrene)-based block copolymer, or poly vinyl naphthalene-based block copolymer.

6. The method of claim 1, wherein the organic solvent comprises dimethylformamide, tetrahydrofuran, or dioxane.

7. The method of claim 1, wherein the aqueous acid comprises an inorganic acid.

8. The method of claim 7, wherein the inorganic acid comprises HCl, $HNO_3$, or $H_2SO_4$.

9. The method of claim 7, wherein the inorganic acid comprises chloroplatinic acid, chloroauric acid, or chloroiridic acid.

10. The method of claim 1, wherein the aqueous acid comprises an organic acid containing a carboxylic acid or sulfonic acid group.

11. The method of claim 10, wherein the organic acid comprises formic acid, acetic acid, benzene sulfonic acid, acrylic acid, glucuronic acid, lactic acid, citric acid, or amino acid.

12. The method of claim 1, wherein the weight ratio of the hydrophobic block to the fluorescent conjugated polymer is greater than 1:1.

* * * * *